UNITED STATES PATENT OFFICE.

LEONHARD ROTH, OF BROOKLYN, ASSIGNOR TO HIMSELF AND ADOLF SCHMIDEBERG, OF NEW YORK, N. Y.

CALORIFIC COMPOUND.

SPECIFICATION forming part of Letters Patent No. 266,205, dated October 17, 1882.

Application filed January 24, 1882. (No specimens.)

*To all whom it may concern:*

Be it known that I, LEONHARD ROTH, of Brooklyn, in the county of Kings and State of New York, have invented a new and Improved Calorific Compound, of which the following is a full, clear, and exact description.

The object of my invention is to provide a new and improved compound or composition for heating purposes, which compound is adapted to absorb great quantities of heat and then emit this absorbed heat gradually.

My composition consists of the following ingredients, combined about in the proportions stated, viz: dry sodium, meta phosphate, (natrum meta phosphoricum siccum,) ten parts; dry sodium citrate, (natrum citricum siccum,) four parts. These two ingredients are thoroughly mixed with each other, and the composition is used in a manner that will be described later.

To produce the dry sodium meta phosphate, I mix ten parts of sodium with two parts of meta phosphoric acid, and to produce the dry sodium citrate I mix ten parts of sodium with three parts crystallized citric acid. The calorific compound described above is placed into metal vessels of any suitable shape or size and either fixed or portable. If made portable, the vessels are placed into hot water or steam, or heated in any other suitable manner, until the compound has melted, whereby a great quantity of heat is absorbed by the compound. The vessel containing the molten compound is then placed into the apartment, &c., to be heated. The compound gradually solidifies or crystallizes, thereby emitting the absorbed heat until the compound is turned to a crystalline mass resembling ice. According to the surrounding temperature, my improved compound requires from ten to twelve hours to solidify, and during this time emits heat. The vessel containing the compound is then again heated, and can be used for ten or twelve hours again, and so on. If the vessels are fixed, a steam-pipe for melting the mixture must pass through or around the vessels. The steam is admitted into these pipes and melts the calorific compound, upon which the steam is shut off, and the heat emitted by the compound in solidifying heats the compartment. Railway-cars, horse-cars, omnibuses, dwellings, &c., can be heated very easily and without any danger from fire or explosion if my improved calorific compound is used.

The devices and apparatus for using my improved calorific compound will be the subject-matter of separate applications for Letters Patent.

I am aware that it is not broadly new to use a fused or melted substance to gradually give out the heat of fusion, as well as its sensible heat, for the purpose of warming a chamber or similar purpose; but

What I claim is—

A composition for storing up and gradually giving out the heat of fusion, as well as the sensible heat, consisting of ten parts of dry sodium meta phosphate and four parts of dry sodium citrate, as described.

LEONHARD ROTH.

Witnesses:
OSCAR F. GUNZ,
C. SEDGWICK.